United States Patent Office 2,941,254
Patented June 21, 1960

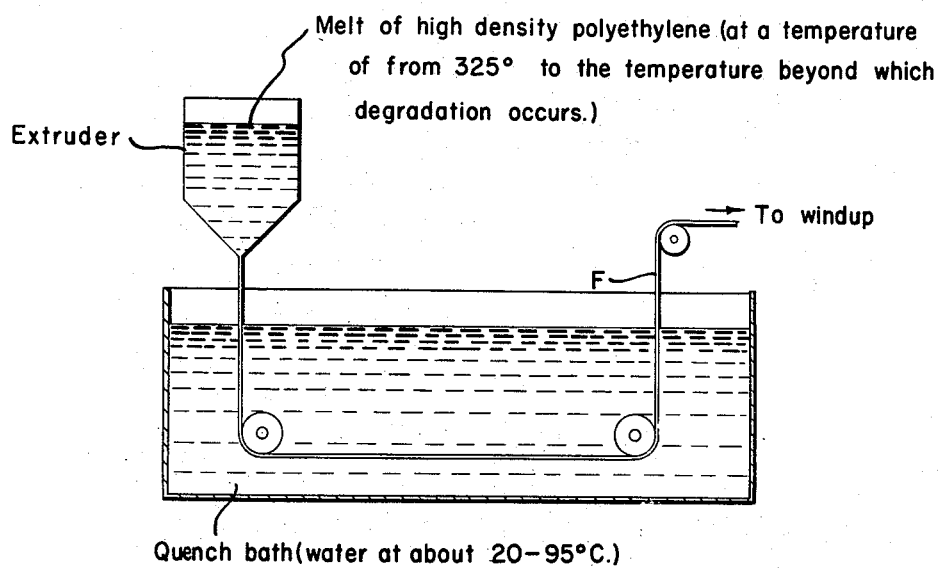

2,941,254

PROCESS OF FORMING POLYETHYLENE FILM AND PRODUCT

Isadore Swerlick, Tonawanda, N.Y., assignor to E. I. du Pont de Nemours and Company, Wilmington, Del., a corporation of Delaware Filed May 20, 1959, Ser. No. 814,944

3 Claims. (Cl. 18—47.5)

This invention relates to a process of forming printable polyethylene structures, and more particularly, to a process of forming printable high-density polyethylene film. This application is a continuation-in-part of my copending application Serial No. 506,660, filed April 6, 1955, and now abandoned.

There has recently been developed a class of linear polyethylene polymers, hereinafter referred to as "high density" polyethylene, which are distinguished from the solid polymers of ethylene heretofore available chiefly, (1) by a higher density, i.e., a density, annealed, in the range of 0.95 to 0.97 as compared with a density of 0.90 to 0.93 for the usual polyethylenes; (2) by a content of amorphous components of not more than 10% (heretofore available polyethylenes have an amorphous content of over 10%); and (3) by a degree of short chain branching, expressed as the ratio of side chains to carbon atoms in the polymer molecule, of not more than 1 side chain per 200 carbon atoms as compared to at least 4 side chains per 200 carbon atoms in the polymer molecule of heretofore available polyethylene. Films prepared from high density polyethylene possess all of the desirable attributes that have made polyethylene film highly useful for packaging a great variety of materials, and, in addition, have high stiffness, or tensile modulus (i.e., lack the characteristic limpness of heretofore available polyethylene film), thus suiting the films for processing in automatic bag-making and packaging machinery.

One of the troublesome disadvantages of polyethylene film (including high density polyethylene extruded under conditions normally employed for melt-extruding polyethylene film) for use in the packaging field is that standard aniline and rotogravure printing inks employed for printing various cellulosic films, such as cellophane, do not adhere satisfactorily to the surface of polyethylene film. Generally, any indicia, such as trademarks, advertising indicia, recipes, etc., imprinted upon a surface of a polyethylene film with standard oil or lacquer type inks employed for printing cellophane film are easily smeared or rubbed off by the normal abrasions suffered by packages during shipping, handling, etc. Hence, in order to obtain satisfactory adhesion between a dried ink and a polyethylene film surface, or the surface of any polyethylene structure, it is necessary to employ a specifically compounded ink, or modify the surface of the structure to promote ink adhesion.

In recent years various treating processes and techniques have been developed to modify the surfaces of polyethylene structures, such as film, to improve the surface characteristics to the extent that the general adhesiveness of the structure is increased. These treating techniques result in improving the adherence between polyethylene structures and dried ink impressions and various coating compoistions. In addition, these treatments are valuable for improving the bond strength between polyethylene film, and other base materials such as glass, wood, paper, metals, etc., when standard adhesive compositions are employed to effect bonding. Some of the well-known treatments for improving the adhesiveness of polyethylene structures, particularly film, include chlorination of the surface of the polyethylene structure described in U.S. Patent No. 2,502,841 to W. F. Henderson; treatment of the polyethylene surface with a gas flame as described in U.S. Patent No. 2,648,097 to M. Kritchever; heating one surface of the polyethylene structure while maintaining the opposite surface at a lower temperature as taught by W. H. Kreidl in U.S. Patent No. 2,632,921; and the treatment of the polyethylene structure in an acid dichromate solution as taught by P. V. Horton in U.S. Patent No. 2,668,134.

An object of the present invention is to provide high density polyethylene structures, particularly films, which are inherently printable, i.e., adhere strongly to dried ink impressions, adhesives, polymeric coatings, etc., without the necessity for treating the formed structure in accordance with any one or more of presently know treatments for rendering polyethylene structures printable. A further object is to prepare a printable high density polyethylene film having such excellent surface properties that the film may be processed directly in converting equipment without being sized or with a minimum of sizing applied. Other objects will be apparent from the description of the invention to follow.

The above objects are accomplished in accordance with the present invention which, briefly stated, comprises forming a polyethylene structure from a melt of a high density polyethylene composition by extruding the melt in the desired structural form, e.g., in film form at a temperature within the range of from 325° C. to the temperature beyond which substantial degradation of the polyethylene occurs, and thereafter quenching the structure, e.g., in an aqueous quench bath maintained at a temperature of from about 20° to about 95° C., to make it form-stable.

The present invention resides in the discovery of a critical temperature above which high density polyethylene compositions may be formed from molten condition into films and other structures which are printable, and yet, have good surface properties, i.e., the surface either has acceptable slip and will not block, or the surface can easily be improved to this condition by applying a size. This process obviates the need for treating formed polyethylene structures, particularly film, in accordance with any one or more of the treatments commonly employed in the trade for rendering present "low density" polyethylene structures printable.

The preparation of high density, film-forming polyethylenes suitable for purposes of this invention is disclosed in U.S. Patent No. 2,816,883, issued to A. W. Larchar and D. C. Pease, in U.S. Patent No. 2,825,721, issued to J. P. Hogan and R. L. Banks, and in a number of patents disclosing the use of reduced transition metal halide catalysts in polymerizations of ethylene, such as U.S. Patent No. 2,862,917, issued to A. W. Anderson, J. M. Bruce, Jr., and E. L. Fallwell.

The preferred embodiment of the present invention is the process of forming a printable film from high density homopolymers of ethylene. More specifically, the high density, printable, polyethylene films formed in accordance with the present process have a degree of short chain branching corresponding to less than one side chain per 200 carbon atoms in the polymer molecule, an amorphous content of not more than 10%, a melting point of at least 127° C., a density (for annealed film) in the range of 0.95 to 0.97, a tensile strength (tenacity) of between 2,900 and 11,000 lbs. per square inch when the sample is elongated at a rate of 5% per minute or less, an initial tensile modulus (stiffness) above 70,000 and usually between 90,000 and 250,000 when the sample is elongated at a rate of 5% per minute or less (measured at 1% elongation), a melt index between 0.1 and 5, preferably between 0.1 and 1.5, and an inherent viscosity within the range from 0.72 to 1.82 as measured in alpha-chloronaphthalene at a concentration of 0.5% at 125° C.

Density measurements are made on polyethylene films after annealing at 125°–130° C. for 1 hour in a steam autoclave or by clamping between glass plates and heating in an oven at 140° C. for 30 minutes, then allowing the oven with film to cool to 65° C. over a period of 1 hour.

The "amorphous content" of the polyethylene structures of the present invention is measured on annealed polymeric film in accordance with the method of Matthews et al., Acta Crystallographica, 2, 85 (1949).

The "degree of short chain branching" of the polyethylene structures is determined by infrared examination and analysis techniques.

The term "melting point," as applied to the polymeric films of this invention, represents the temperature at which complete disappearance of the crystalline structure is observed under a polarizing microscope when a film of 100–300 microns in thickness is heated slowly in a microheating stage.

The tensile strength or tenacity of the present film structures is based upon the initial cross-sectional area of the sample. Tenacity at break is determined by elongating the film sample at a rate of 5% per minute or less until the film sample breaks.

"Initial tensile modulus" is a measure of film stiffness, i.e., the higher the modulus the greater the stiffness, and the modulus is the slope of the initial portion of the stress/strain curve at 1% elongation, the film being elongated at a rate of 5% per minute or less.

The "melt index" is a measurement of the flow rate of the polymers, and this test is carried out in accordance with ASTM Test D–1238–52T.

"Inherent viscosity" is defined by L. H. Cragg, J. of Colloid Science I, 261–269 (1946).

$$\text{Inherent viscosity} = \frac{\ln n_r}{c}$$

wherein "ln" is the natural logarithm, "$n_r$" is the viscosity of the solution relative to the solvent, and "$c$" is the concentration expressed in grams of solute per 100 cc. of solvent.

The accompanying drawing illustrates diagrammatically a typical arrangement of apparatus suitable for carrying out the process of this invention.

The following examples will serve to further illustrate the process of the present invention. In all of the examples, summarized in Table I, films ranging in thickness from 1 to 4 mils, were extruded from a National Rubber Machinery extruder into a water quench bath. The melt temperature of the high density polyethylene composition extruded is that indicated in Table I, and in each example the molten film was extruded into an aqueous quench bath maintained at a temperature in the neighborhood of 50° C. The high density polyethylene films so prepared had physical properties in the neighborhood of those values indicated below:

| | |
|---|---|
| Density | 0.957. |
| Percent amorphous content | 10%. |
| Amount of short chain branching | Less than 0.2 per 100 carbon atoms in the polymer molecule. |
| Tensile modulus (stiffness) | About 150,000 p.s.i. |
| Melt index | 0.4. |
| Inherent viscosity (in alpha-chloronaphthalene at a concentration of 0.5% at 125° C.) | 1.4. |

Printability, as recorded in Table I, was determined by applying Bensing Brothers and Deeney "Excellobrite" white ink (W–500) onto the film surface with a commercial ink spreader which comprised a steel rod having fine wire wrapped around the rod. The spreader produced a multiplicity of fine lines. The ink was dried for about 3 minutes at 30° C. and thereafter permitted to cool at room temperature. Adhesion between the printing ink and the film surface was then tested by applying a strip of pressure-sensitive tape upon the printed surface and pressing the tape firmly into contact with the film surface. The tape was then stripped off rapidly from the film surface, and if any ink were removed, the printability was classed as "no printability." Hence, film was considered to be printable if no ink were removed in this test.

In Examples 1 and 2 the high density polyethylene composition contained about 0.05% of "Santowhite" crystals (a dialkyl phenol-sulfide; Monsanto Chemical Company) as an antioxidant, based upon the weight of the ethylene polymer. In Examples 3–5 inclusive, the polymer contained about 0.09%, by weight, of the antioxidant.

TABLE I

| Example | Melt Temperature, °C. | Printability |
|---|---|---|
| 1 | 265 | No. |
| 2 | 325 | Yes. |
| 3 | 340 | Yes. |
| 4 | 348 | Yes. |
| 5 | 350 | Yes. |

All of the printable films (those prepared in Examples 2–5, inclusive) had good surface properties, i.e., the film-to-film slip was good and they did not block. "Slip" is defined as the measure of the ease with which two contacting surfaces of the film slide past each other when held together under constant pressure while being subjected to a shearing action. A film having good slip means that the adjacent film surfaces easily slip past each other even when appreciable pressure is applied to the layers. In this case film slip was evaluated by compressing two layers of film between the thumb and forefinger and moving the fingers in a plane parallel to the plane of the adjacent films to slide one film surface over the other. If the films slipped over one another, the film slip was considered to be excellent. If the films moved only with considerable effort, the slip was considered to be very poor.

"Blocking" is defined as the tendency of a film to adhere when two or more surfaces are pressed together. In this test for blocking, two layers of film were pressed together between the thumb and forefinger and held for several minutes. Thereafter, the films were placed on a flat surface and they were pulled apart. If the films tended to stick together at the area where they were pressed together, it was considered that the films "blocked badly." If there was no tendency for the films to stick together upon attempting to separate them, it was considered that the films "did not block."

In comparison with the above examples summarized in Table I, samples of commercially available low-density polyethylene compositions were extruded into film form at various melt temperatures. Normally, low-density polyethylene compositions are extruded from a melt maintained at a temperature in the neighborhood of 265° C. On the other hand, if the low density polyethylene composition contains an adequate quantity of a suitable antioxidant, for example, quantities of butylated hydroxy anisole up to 0.02%, by weight of the ethylene polymer composition, the polyethylene may be extruded at higher melt temperatures. Although low density polyethylenes containing a high concentration of antioxidant may be extruded at a temperature as high as 3,25° C., extrusion is difficult because of the high fluidity of the melt. At temperatures higher than 325° C. the melt is so fluid that it cannot easily be formed into the shape of a film, i.e., the formed melt tends to disintegrate. Furthermore, unless the extrusion barrel and associated orifice are heated to a high degree of uniformity and a minimum hold-up of polymer in the extruder is maintained, the polymer will degrade before it is extruded. Although film extruded at these high temperatures from low-density polyethylenes has been found to be printable in spots (printability is not uniform), the surface properties of the film have been very poor in comparison to those of the high density polyethylene films extruded at the same temperatures. The low-density films are very tacky, have practically no film-to-film slip, and block badly. On the other hand the high density polyethylene films extruded at the elevated temperatures specified hereinbefore may be used directly in converting equipment, e.g., bag-making machines, without the application of a sizing.

In addition to printing inks, a wide variety of polymeric coatings may be readily adhered to the high density polyethylene films of this invention. Such coating compositions may be applied from solvent solutions or from dispersions, e.g., aqueous, of polymers in an inert liquid medium. Suitable polymeric coatings include vinylidene chloride copolymerized with alkyl acrylates, acrylonitrile, and alkyl methacrylates; polyvinyl acetals, such as polyvinyl butyral; polyamides, such as polyhexamethylene adipamide and sebacamide, polycaproamide, and N-methoxymethyl polyhexamethylene adipamide; nitrocellulose; chlorinated rubber; ethyl cellulose; and vinyl chloride/vinyl acetate copolymer.

Multiple coatings of polymers may also be applied to the treated films of this invention. For example, a soft elastomeric subcoat may be applied as a subcoating and a hard vinylidene chloride copolymer top coating applied thereafter. These multiple coatings are described in more detail in U.S. Patent No. 2,824,024 in the name of A. F. Chapman, U.S. Patent No. 2,829,069 in the name of R. H. Michel, and U.S. Patent No. 2,829,068 in the name of J. J. Stewart.

*Example 6*

The printable high density polyethylene films formed in accordance with Examples 2 and 5 were coated on both sides by dipping the films in a solvent solution (10% solids) of polyvinyl butyral. The films were dried at 95° C.

To illustrate that good adhesion was obtained between the polyvinyl butyral coating and the high density polyethylene film, the samples of film were cut into strips ½" in width and 4" in length. These strips were sealed together with a bar type sealer (bar produced a seal ½" in width) at a temperature of 185° C. and pressure of 10 p.s.i. The seal strength was tested by opening the sealed strips at one end and clamping these ends in the jaws of a Suter Tensile Tester so that the sealed area was peeled as the jaws opened. The jaws were opened at a rate of 12" per minute, and the seal strength was recorded as the highest force in grams per inch required to peel the strips apart. The coated film of Example 2 exhibited a heat seal value of 656 grams per inch, and the coated film of Example 5 exhibited a heat seal value of 764 grams per inch.

*Example 7*

Additional samples of the films prepared in Example 6 were pressed between metal platens maintained at a temperature from 90° C.–104° C. at a pressure of 40,000 lbs. per square inch for various periods of time. Thereafter, the coated strips were heat sealed together in the manner described above, and the following results were obtained.

(A) Pressed at 40,000 p.s.i. at 90° C. for 1 minute:

| Film: | Heat-seal strength (gms./in.) |
|---|---|
| Coated film of Example 2 | 544 |
| Coated film of Example 5 | 604 |

(B) Pressed at 40,000 p.s.i. at 90° C. for 5 minutes:

| Film: | Heat-seal strength (gms./in.) |
|---|---|
| Coated film of Example 2 | 584 |
| Coated film of Example 5 | 736 |

(C) Pressed at 40,000 p.s.i. at 104° C. for 5 minutes:

| Film: | Heat-seal strength (gms./in.) |
|---|---|
| Coated film of Example 2 | 788 |
| Coated film of Example 5 | 1084 |

*Example 8*

Samples of the high density polyethylene film as prepared in Examples 2 and 5 were each coated with an aqueous dispersion of a 50/50 (weight ratio) copolymer prepared by copolymerizing vinylidene chloride with 2-ethyl hexyl acrylate (equal portions of both components were permitted to copolymerize). This coating was dried, and thereafter a top coating of a second polymer was applied from an aqueous dispersion. This second copolymer was prepared by reacting 94 parts by weight of vinylidene chloride with 6 parts by weight of methyl acrylate, based upon the total weight of vinylidene chloride and methyl acrylate, and 2% of itaconic acid, based upon the total weight of vinylidene chloride and methyl acrylate. After the top coating was thoroughly dried, strips of the coated film were cut to be heat sealed as described above. The coated film of Example 2 exhibited a heat seal strength of 280 grams per inch, and the coated film of Example 5 exhibited a heat seal value of 608 grams per inch.

I claim:

1. The process which comprises extruding high density polyethylene in film form at a temperature within the range of from 325° C. to the temperature beyond which substantial degradation of the polyethylene occurs, quenching the extruded high density polyethylene film, and thereafter coating said film with a coating composition whereby to form thereon an adherent coating.

2. Coated high density polyethylene film prepared in accordance with the process of claim 1.

3. The process which comprises extruding high density polyethylene in film form at a temperature within the range of from 325° C. to the temperature beyond which substantial degradation of the polyethylene occurs, quenching the extruded high density polyethylene film, and thereafter imprinting said film with a printing ink.

References Cited in the file of this patent

UNITED STATES PATENTS

| 2,801,446 | Wolinski | Aug. 6, 1957 |
| 2,859,480 | Berthold et al. | Nov. 11, 1958 |